United States Patent [19]

Stark

[11] Patent Number: 4,769,352

[45] Date of Patent: Sep. 6, 1988

[54] REFRACTORY CEMENT CONTAINING LITHIUM FLUORIDE FLUX

[75] Inventor: Ronald A. Stark, Hubbardston, Mass.

[73] Assignee: Norton Company, Worcester, Mass.

[21] Appl. No.: 633,542

[22] Filed: Jul. 23, 1984

[51] Int. Cl.$^4$ .................. C04B 35/04; C04B 35/44
[52] U.S. Cl. .................... 501/120; 501/108; 501/121; 501/135; 501/151
[58] Field of Search ............. 106/121; 501/10, 108, 501/120, 122, 119, 151, 135

[56] References Cited

U.S. PATENT DOCUMENTS

| | | | |
|---|---|---|---|
| 3,257,217 | 6/1966 | Van Dresser et al. | 501/122 |
| 3,342,616 | 9/1967 | Alper et al. | 106/59 |
| 3,492,383 | 1/1970 | Heimgartner | 264/30 |
| 3,577,247 | 5/1971 | McKenna | 501/120 |
| 3,587,198 | 6/1971 | Hensel | 52/741 |
| 3,625,721 | 12/1971 | Snyder et al. | 106/65 |
| 3,751,571 | 8/1973 | Burrows | 13/35 |
| 3,767,375 | 10/1973 | Brichard et al. | 65/182 |
| 3,974,249 | 8/1976 | Roy et al. | 264/65 |
| 4,138,455 | 2/1979 | Shaikh et at. | 264/56 |

FOREIGN PATENT DOCUMENTS 2031399  4/1980  United Kingdom ............... 501/151

*Primary Examiner*—Mark L. Bell
*Assistant Examiner*—Karl Group
*Attorney, Agent, or Firm*—Arthur A. Loiselle, Jr.

[57] ABSTRACT

A cement for vessels for containing molten alloys of aluminum with metals selected from the group consisting of lithium, magnesium, zinc and copper is shown that forms a hard sintered crust for containing the molten alloy in the vessel with a backing of granular cement for controlling thermal stress while also providing a vitrifying flux means in the cement mix for effecting a sealing of any cracks that may form in the crust by reacting with any hot alloy flowing through such a crack to contain the leak as a metal spur.

7 Claims, No Drawings

REFRACTORY CEMENT CONTAINING LITHIUM FLUORIDE FLUX

TECHNICAL FIELD

This invention relates to a cement for use in vessels containing molten alloys of aluminum with metals selected from the group consisting of lithium, magnesium, copper and zinc.

BACKGROUND ART AND INFORMATION DISCLOSURE STATEMENT

The following publications are representative of the most pertinent prior art known to the Applicant at the time of the filing of this application.

| U.S. PAT. NOS. | | |
|---|---|---|
| 3,342,616 | Alper et al | Sept. 19, 1967 |
| 3,492,383 | Heimgartner | June 27, 1970 |
| 3,587,198 | Hensel | June 28, 1971 |
| 3,625,721 | Snyder | Dec. 7, 1971 |
| 3,751,571 | Burrows | Aug. 7, 1973 |
| 3,767,375 | Brichard et al | Oct. 23, 1973 |
| 3,974,249 | Roy et al | Aug. 10, 1976 |
| 4,138,455 | Shaikh et al | Feb. 6, 1979 |

A containment problem has arisen in the manufacture of certain alloys of aluminum and particularly alloys of aluminum and lithium. The metals are melted together in either channel or coreless induction furnaces and the molten metals are transported or carried or passed through various processing steps in ladles, filter boxes, tundishes or come in contact with mold tops etc. These elements of the metal processing equipment are lined in various ways with refractory elements designed to hold the molten metal and protect the structural support elements of the equipment from chemical attack and the thermal stresses produced by the high fusion temperature of the fluid bath contained in srch equipment during the melting and alloying of the metals.

Various kinds of refractory liners have been proposed for use in induction furnaces and the like as illustrated in the following United States Patents:

U.S. Pat. Nos. 3,492,383 and 3,587,198 are early examples of plural layers of refractory coatings in furnaces. The earlier patent shows a sintered liner that is backed-up by a cushion layer designed to contain molten metal in an induction furnace.

The Burrows U.S. Pat. No. 3,751,571 shows a somewhat more advanced version of the cushion layer design. In Burrows, a monolithic cast and cured liner is formed in a furnace, the inner surface of which is sintered when a melt is produced in the furnace to produce a crust backed-up by a soft friable zone that has a hard hydraulically cured outer zone beyond the friable layer. This tri-zone type of liner tends to protect the supporting structure from heat damage and corrosive metal attack by providing the friable layer to catch molten metal that issues through cracks that inevitably form in the sintered inner face.

U.S. Pat. No. 3,767,375 discloses the use of prefabricated refractory bricks having the joints between the bricks filled with a powdered material such as carbon, alumina, chromia or other material that is not wetted by molten metal so that the metal does not penetrate through the restricted spaces between the particles of the filler material.

As taught herein, a preferred refractory liner for induction furnaces and the like can take the form of a dry cement that may be placed in the vessel to be protected and vibrated into a compacted layer. The dry vibrated layer is then subjected to a sintering action to form a crust or hard layer on the surface of a semi-sintered and/or unsintered compacted cement forming a back up support which retains the form of a compacted plastic or granular layer behind the sintered surface layer to insulate the structural support means of the vessel from direct contact with the molten bath and simultaneously produce a stress accommodating layer between the sintered crust and back wall or support for the molten liquid container. Such refractory liner is well adapted to provide a vessel for holding the molten metal while protecting the supporting structure from thermal expansion without subjecting any part of the furnacing equipment to an undue stress.

This above described invention builds on the above noted patented teachings and provides a container structure for particular kinds of molten alloys wherein a sintered crust is backed-up by a semi-sintered and/or granular layer to control the transmission of heat and expansion stresses from the container to the support means. The granular backing layer serves a further function as here taught by having included therein materials for reacting with any spurs of molten alloy metal flowing through the inevitable cracks that form in the sintered container to form reaction products that seal off the crack and prevent the further flow of molten metal much beyond the containment vessel. This desired result is accomplished by providing a dry vibratable cement composition having a specific chemical composition adapted to react with the aluminum lithium, or aluminum magnesium or aluminum zinc alloy being produced, as will appear more fully below.

The novel cement proposed for such use herein includes a base grain component of stoichiometric, or magnesia rich hyperstoichiometric spinel or magnesia grain either calcined or fused mixed with the added flux mix also containing a lithium fluoride flux added to this base grain, fine fractions of alumina, silica magnesia and/or spinel fractions.

In connection with the chemical aspects of this invention, it is known that lithia stabilizes periclase based solid refractory solutions including spinel as taught in U.S. Pat. No. 3,342,616. This stabilized refractory composition has been suggested for use in metalurgical furnaces, refractory tubes, spark plug insulators and the like.

A permeable refractory brick has been formed with alumina, a lithium compound, a small amount of magnesia and other metal oxides as shown in U.S. Pat. No.3,625,721.

In a non-related art, a patent has been noted showing a combination of materials like those shown herein, for example U.S. Pat. No. 3,974,249 shows a method of forming a solid light transmitting refractory body that is produced by combining equal molar amounts of magnesia and alumina that can be calcined in the presence of a small addition of lithium fluoride to react the mass to form spinel, which can then be cooled and pressed to form a self sustaining compact that can then be fired in a wet hydrogen atmosphere to produce a transparent ceramic body.

DISCLOSURE OF THE INVENTION

It has been found that molten alloys of aluminum with lithium can be melted together more efficiently in channel and coreless induction furnaces by providing a cement liner for such furnaces, that can be sintered in situ, to produce an inner crust that forms a container for the molten mass that is supported by an unsintered granular or semi-sintered plastic layer of the same refractory cement mix. After the cement has been compacted in place in the furnace the production of the molten aluminum-lithium alloy may be commenced and as the heat develops in the melting mass, the surface layer of the dry vibrated refractory cement is sintered to form a crust that is supported by the unsintered granular mix behind it. As suggested above, such a granular or plastic cement liner surrounding the sintered crust insulates the support structure of the furnace from heat damage and serves to craddle the sintered crust that forms the container for the melting mass to insulate the crust from expansion stresses to which it would otherwise be subjected if it were supported in a solid refractory body.

The herein disclosed cement mix that is recommended for use in the production of an aluminum lithium alloy, includes a magnesia spinel or a magnesia and alumina mix to form a spinel which upon being heated together with a flux of lithium fluoride, alumina, silica, titania, magnesia and/or spinel first is reacted to form a low temperature bond in the crust forming zone that provides a form of container for the molten metal while the temperature increases and the sintering process proceeds. The alumina, silica, titania, and/or magnesia may be present in an amount of up to 13% by weight. After a suitable liner mix has been compacted in place, heat is applied to the furnace to melt the metals to be alloyed. As the temperature increases, a fluxing reaction takes place between the fluxing compounds to form first a liquid phase which may be an aqueous solution and/or glass depending on temperature and composition, then to $Li_2SiO_3$; $LiAlO_2$; $LiAl_2O_4$; $Li_4SiO_4$ and/or $LiAlSi_4O_{10}$ to produce a hard crust on the surface of the liner which provides a low temperature bond for the crust and serves to support the molten metal bath until the ultimate sintering of the crust can be completed.

The resulting fully sintered crust and unsintered layer forms a composite liner structure that has a hard dense sintered crust or container like surface for holding the molten alloy, the container being supported by partially or toatally unreacted semi-sintered or granular cement mix layer between it and the back wall of the furnace. The crusted layer or container element can shift with thermal expansion in the granular or plastic supporting bed to reduce the incidence of cracking while the granular layer further serves as an insulating back wall to shield the outer furnace walls from direct exposure to the heat of the melt.

If a crack should occur in the sintered crust or container supported in the plastic or granular mix, the molten metal flowing through the crack and coming in contact with the granular backing, produces the fluxing reaction above described to form a sintered shell to surround the spur that subsequently becomes fully sintered whereby the leak is contained.

DESCRIPTION OF THE PREFERRED EMBODIMENTS

The cement of this invention includes predominantly a base grain in the range of 85% or more by weight of the final mix, the base grain being stoichiometric, or magnesia rich hyperstoichiometric, spinel or magnesia grain. This base grain may be either fused and crushed or calcined. It is prepared in a size range distribution to produce a maximum density with minimum porosity when the cement mix is compacted in place with a conventional dry vibrating procedure.

To the base grain, a lithium fluoride flux is added in a percent by weight within a range of up to 3% by weight of the mix but preferably 0.5% will be found to be sufficient. The remainder of the cement mix to make up to 100% is alumina, silica, magnesia and/or spinel. These components of the mix are added as fine fractions that are adapted to react with the lithium. Very fine particles such as calcined periclase, electrical magnesia dust collector fines, alumina dust collector fines, reactive alumina, and Potters Flint are the preferred additions used for this purpose.

A small addition of boric acid in the form of $HBO_2$ $H_3BO_3$ or anhydrous boric acid about equal to the lithium fluoride content may also be added to the mix but this is not deemed essential.

Examples of preferred mixes are as follows;

| Grain | A | B | C |
|---|---|---|---|
| Spinel .5–4 mm | 55 | 55 | 56 |
| Spinel .12–5 mm | 15 | 15 | 15 |
| Spinel 0–.12 mm | 16 | 16 | 16 |
| Calcined Periclase 100 F Boron content 300 ppm min. | 4 | 4 | — |
| Fused MgO Electrical 200 F | 5 | — | — |
| 38 Aluminum Oxide 200 F | 4 | 4 | 4 |
| Boric Acid May be boric acid or anhydrous boric acid; the latter in lesser quantity to compensate for loss of water of hydration. | .5 | .5 | .5 |
| Lithium Fluoride (LiF) | .5 | .5 | .5 |
| Reactive Alumina | — | 5 | 5 |
| Potters Flint | — | — | 3 |

The cement mix described herein is particularly suggested for use in channel and coreless induction furnaces used in the production of aluminum-lithium alloys. It may find use also in other pieces of equipment for holding molten alloy material such as in transport vessels, laddles, filter boxes, tundishes, mold taps and the like.

The cement may also be used to contain other aluminum alloys with magnesium and zinc. The lithium fluoride flux together with the additions of periclase alumina dust collector fines, magnesia fines, reactive alumina and/or Potters Flint will react to contain any metal spurs escaping from the hardened face supported by the granular mix. The herein described flux will react with the magnesium and zinc additions to the aluminum metal to first produce the sintered crust container for the molten metal and will further react with any molten metal leaking from the crust into the granular backing to contain the leak and prevent it from flowing outwardly into contact with the support structure for the furnace or other molten metal processing equipment.

The above description is based on the best mode known to the inventor at the present time and is not to be considered limiting. The product of this invention is a raw batch adapted to be fired in situ to produce a more satisfactory refractory liner for use in the production of aluminum alloys with lithium, magnesium or zinc in furnaces, and other containers or conduits for the molten metals. The ultimate refractory liner has improved stress accomodating characteristics as well as insulating and metal containing properties.

What is claimed is:

1. A refractory cement consisting essentially of a base grain selected from the group consisting of stoichiometric spinel, hyperstoichiometric magnesia rech spinel, and magnesia, said base grain making up at least 85% by weight of the total mix, and being mixed with about 0.5% to 3% by weight of a flux containing lithium fluoride and up to about 13% by weight of a component selected from the group consisting of finely ground particles of alumina, silica, titania, magnesia and mixtures thereof.

2. A cement as in claim 1 with an addition of boric acid in an amount substantially equal to the lithium fluoride content of said flux.

3. A cement as in claim 2 wherein said base grain is fused and crushed.

4. A cement as in claim 1 wherein said base grain is calcined.

5. A cement as in claim 1 wherein said base grain is fused and crushed.

6. A cement as in claim 1 wherein said base grain is selected to have a size distribution to produce a maximum density upon being vibrated to be compacted.

7. A cement as in claim 5 wherein said base grain is fused and crushed.

* * * * *